2 Sheets—Sheet 1.
C. T. JAMES.
Projectile.
No. 1,275.
Reissued Feb. 11, 1862.
Fig. 2. A, a,
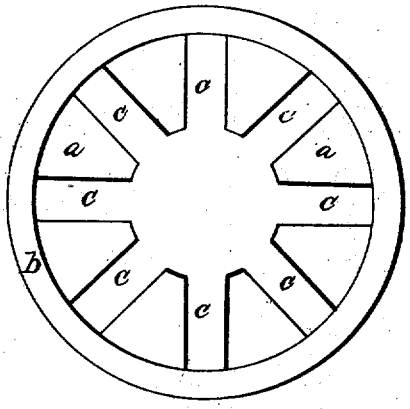
Fig. 1.
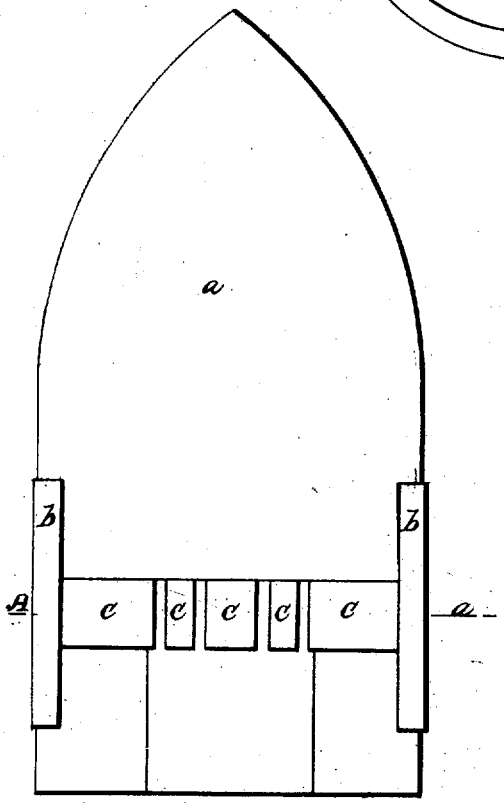
Fig. 3.
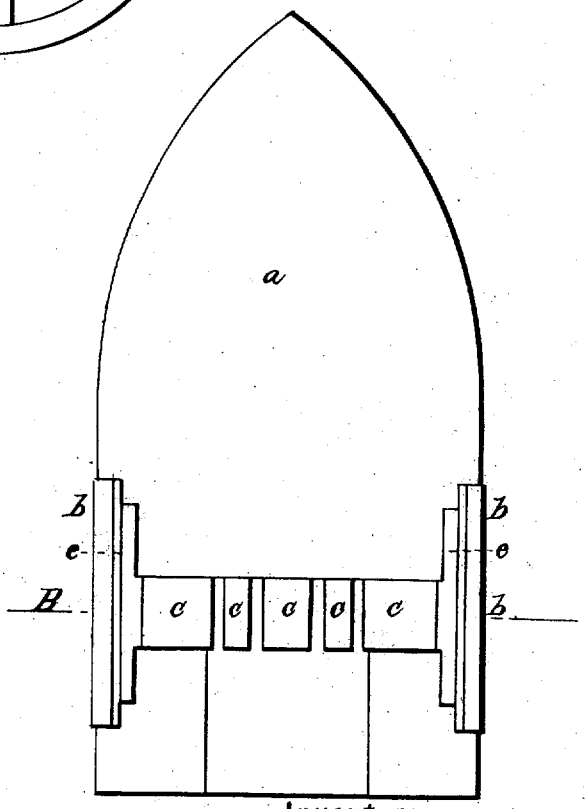
Witnesses:
Inventor:
N. PETERS, PHOTO-LITHOGRAPHER, WASHINGTON, D. C.

2 Sheets—Sheet 2.
C. T. JAMES.
Projectile.
No. 1,275.
Reissued Feb. 11, 1862.
Fig. 5. B. 2.
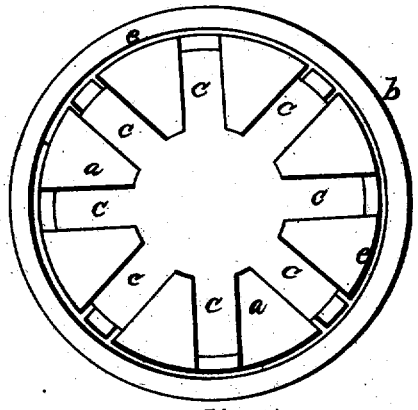
Fig. 4.
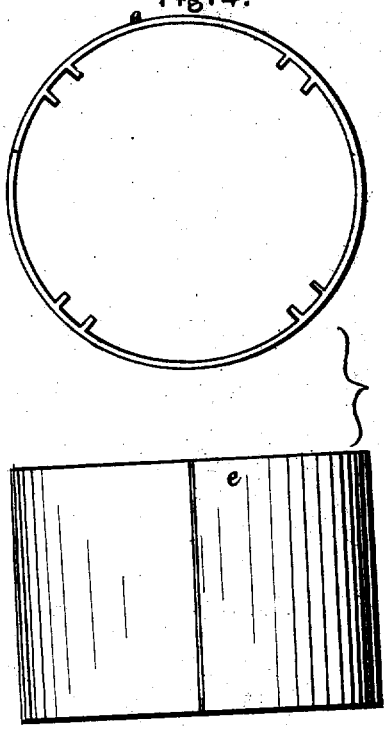
Witnesses:
Inventor:
N. PETERS, PHOTO-LITHOGRAPHER, WASHINGTON, D. C.

UNITED STATES PATENT OFFICE.

CHARLES T. JAMES, OF PROVIDENCE, RHODE ISLAND.

IMPROVEMENT IN PROJECTILES.

Specification forming part of Letters Patent No. 14,315, dated February 26, 1856; Reissue No. 1,098, dated December 11, 1860; Reissue No. 1,275, dated February 11, 1862.

*To all whom it may concern:*

Be it known that I, CHARLES T. JAMES, of Providence, in the State of Rhode Island, have invented certain new and useful Improvements in Projectiles; and I do hereby declare that the following is a full, clear, and exact description thereof, reference being had to the accompanying drawings, making part of this specification, in which—

Figure 1 is a longitudinal section of the simplest form of construction; and Fig. 2, a cross-section of the same, taken at the line A *a* of Fig. 1; and Fig. 3 is a longitudinal section of the same projectile, but with the inner part of the expansible packing formed of a cut-metal hoop, represented separately in Fig. 4; and Fig. 5 is a cross-section of Fig. 3 at the line B *b*.

The object of my invention is to produce a projectile which, when fired from a rifled cannon, shall not only shut off the windage, (which is known to be wasteful of the power of the charge,) but enter and follow the grooves of the rifled bore, and thus acquire the rotary motion so essential to accurate shooting; and to this end the first part of my said invention consists in combining with the body of the projectile an expansible packing capable of being expanded outwardly against the bore of the cannon and into the grooves thereof, if rifled, by the force of the exploded charge acting inside of such packing. This part of my invention consists in connecting the expansible packing with the body of the projectile by clips, which will not prevent the required expansion, and which will be sure to impart to the body of the projectile the rotary motion received by the packing from the rifled grooves of the bore of the cannon; and to avoid injuring the bore of the cannon, by reason of the close contact of the packing therewith during the discharge, the second part of my said invention consists in making the outer surface of the packing, which is to be forced into contact with the bore of the cannon and into the grooves thereof, of fibrous or textile or equivalent nonmetallic substance.

In the accompanying drawings, *a* represents the body of the projectile, which I prefer to make of a cylindrical form, pointed at the forward end. The cylindrical part is formed with a broad groove extending all around to receive the expansible packing-ring *b*. From the bottom of this groove radial mortises or ducts *c* extend to and communicate with the rear portion, which is hollow, that the gases evolved by the explosion of the charge may pass through to act on the inside of the packing-ring *b*, to force it outward against the bore of the cannon and into the grooves thereof, if rifled.

Any other suitable mode of construction by which the force generated by the explosion of the charge can be made to act inside of the packing to expand it outwardly may be substituted.

The expansible packing-ring *b* in Fig. 1 is represented as being made of spun and braided yarn greased; but I prefer to make the said packing, as represented in Figs. 3, 4, and 5, of a metal hoop, *e*, cut so that it can be sprung into the groove, and to admit of the required expansion by the force of the discharge. This hoop is wrapped around on the outside with bands of woven canvas, which I prefer to have greased, to act as a lubricator. The outer wrapping of the ring, when completed, may be of a diameter slightly greater than that of the cylindrical part of the body of the projectile. The metallic hoop should be connected with the body of the projectile by suitable clips, which will permit it to expand, and which at the same time will cause the body of the projectile to turn with it as it follows the rifle-grooves of the bore; and although I have above described the mode of construction which I deem the best, I do not wish to be understood as limiting my claim of invention to such mode, as other and equivalent modes of construction may be adopted or devised involving the mode of operation invented by me, and which I desire to secure by Letters Patent, and which I have above defined as constituting the first part of my said invention; and as to the second part of my said invention, it will be obvious that many other substances may be substituted for the woven canvas or braid, and as the equivalent thereof, as a means of preventing the bore of the cannon from being injured by the contact of the packing, when by any means it is forced against the bore and into the rifle-grooves.

What I claim as my invention, and desire to secure by Letters Patent, is—

1. Combining with the body of the projectile an expansible packing, substantially as described, and capable of being expanded outwardly against the bore of the cannon, and into the grooves thereof, if rifled, by the force of the exploded charge acting inside of such packing, substantially as described.

2. Connecting the expansible packing with the body of the projectile by clips, which will not prevent the required expansion, and which will insure the rotation of the body of the projectile with such packing, as described.

3. Making the outer surface of the packing of projectiles intended to be forced into contact with the bore of the cannon and into the grooves thereof of fibrous or textile or equivalent non-metallic substance, substantially as described.

CHAS. T. JAMES.

Witnesses:
ANDREW J. TODD,
A. DE LACY.